(12) United States Patent
Akamatsu

(10) Patent No.: US 8,104,968 B2
(45) Date of Patent: Jan. 31, 2012

(54) ROLLING CONTACT BEARING

(75) Inventor: Yoshinobu Akamatsu, Iwata (JP)

(73) Assignee: NTN Corporation, Osaka (JP)

( * ) Notice: Subject to any disclaimer, the term of this patent is extended or adjusted under 35 U.S.C. 154(b) by 634 days.

(21) Appl. No.: 12/225,532

(22) PCT Filed: Mar. 26, 2007

(86) PCT No.: PCT/JP2007/000294
§ 371 (c)(1),
(2), (4) Date: Sep. 24, 2008

(87) PCT Pub. No.: WO2007/116581
PCT Pub. Date: Oct. 18, 2007

(65) Prior Publication Data
US 2009/0169144 A1 Jul. 2, 2009

(30) Foreign Application Priority Data
Mar. 27, 2006 (JP) ................... 2006-085027

(51) Int. Cl.
*F16C 19/16* (2006.01)
*F16C 33/58* (2006.01)
*F16C 33/64* (2006.01)

(52) U.S. Cl. .................. 384/450; 384/492; 384/513

(58) Field of Classification Search .................. 384/450, 384/490, 492, 513, 516; 702/34–56, 186–189
See application file for complete search history.

(56) References Cited

U.S. PATENT DOCUMENTS

| | | | | |
|---|---|---|---|---|
| 3,292,980 A | * | 12/1966 | Gustafsson et al. | 384/516 |
| 3,608,244 A | * | 9/1971 | Robinson | 451/246 |
| 5,495,764 A | * | 3/1996 | Matsuzaki et al. | 73/593 |
| 5,782,563 A | * | 7/1998 | Muto et al. | 384/450 |
| 6,051,082 A | * | 4/2000 | Okita et al. | 148/333 |
| 6,371,653 B2 | * | 4/2002 | Yajima et al. | 384/490 |
| 6,474,871 B2 | * | 11/2002 | Yajima et al. | 384/450 |
| 6,582,128 B2 | * | 6/2003 | Nakano et al. | 384/450 |
| 7,421,349 B1 | * | 9/2008 | Stack | 73/660 |
| 7,877,215 B2 | * | 1/2011 | Akamatsu | 73/593 |

FOREIGN PATENT DOCUMENTS

| | | | | |
|---|---|---|---|---|
| JP | 04296216 A | * | 10/1992 | |
| JP | 10066300 A | * | 3/1998 | |
| JP | 11201153 A | * | 7/1999 | |
| JP | 11248441 A | * | 9/1999 | |
| JP | 2000-167724 | | 6/2000 | |
| JP | 2004068877 A | * | 3/2004 | |

(Continued)

OTHER PUBLICATIONS

Chinese Office Action issued Dec. 25, 2009 in corresponding Chinese Patent Application 2007800105641.

(Continued)

*Primary Examiner* — Marcus Charles

(57) ABSTRACT

The sectional shape of a rolling surface of at least one of bearing component parts has the following relation between the order n (n being an arbitrarily chosen natural number) and the amplitude r of waviness relative to the circularity of the sectional shape. The order n and the amplitude r are logarithmically transformed to define $X=\text{Log}(n)$ from the order n and $Y=\text{Log}(r_n)$ from the amplitude r of n-order. When a regression line $Y=aX+b$ is determined, the ratio $\delta/\sigma$ of the deviation $\delta$ at each X from the regression line of Y to the standard deviation $\sigma$ is chosen to be smaller than 4.

6 Claims, 3 Drawing Sheets

FOREIGN PATENT DOCUMENTS

| | | | | |
|---|---|---|---|---|
| JP | 2004116751 A | * | 4/2004 | |
| JP | 2004308822 A | * | 11/2004 | |

OTHER PUBLICATIONS

Yoshinobu Akamatsu, "Effects of Rolling Element Material on Vibration of Bearing", *Proceedings of Conference of Tribology, Society of Tribology*, Nov. 2001, pp. 291-292.

U.S. Appl. No. 11/989,755, filed Jan. 31, 2008, Yoshinobu Akamatsu, NTN Corporation of Osaka, Japan.

International Search Report (Mailed Jun. 19, 2007 for International Application No. PCT/JP2007/000294).

English translation of the International Preliminary Report on Patentability mailed on Oct. 30, 2008 and issued in corresponding International Patent Application No. PCT/JP2007/000294.

Tomoya Sakaguchi, et al., "Simulation for Ball Bearing Vibration", *NTN Technical Review No. 69* (Aug. 2001), pp. cover page and 69-75.

Japanese Office Action dated Nov. 1, 2011, issued in corresponding Japanese Patent Application No. 2006-085027.

Japanese Office Action dated Oct. 24, 2011, issued in corresponding Japanese Patent Application No. 2006-085027.

* cited by examiner

ROLLING CONTACT BEARING

CROSS REFERENCE TO RELATED APPLICATIONS

This application claims the benefit under 35 U.S.C. Section 371 of International Application No. PCT/JP2007/000294, filed Mar. 26, 2007, which claimed priority to Japanese Application No. 2006-085027, filed Mar. 27, 2006 in the Japanese Patent Office, the disclosures of which are hereby incorporated by reference.

BACKGROUND OF THE INVENTION

1. Field of the Invention

The present invention relates to a rolling contact bearing assembly of a kind used in association with, for example, an electric motor.

2. Description of the Prior Art

Any form errors a component part such as, for example, an inner ring, an outer ring or rolling elements all employed in a rolling contact bearing assembly, a machine having such rolling contact bearing assembly incorporated therein to generate vibrations. Accordingly, it has bean a general practice to minimize the circularity of rolling surfaces of the inner and outer rings and that of the rolling elements. Also, in the bearing assembly which is utilized with an axial preload applied, the waviness order present in waviness or undulation that lead to vibrations is fixed in view of the geometric relation and, therefore, minimization of the waviness of a particular order has been effective (See the Non-patent Document 1 below.).

Non-Patent Document 1

Sakaguchi, T. and Akamatsu, Y, "Simulation for Ball Bearing Vibration", NTN Technical Journal, No. 69, 2001, P 69-75.

Non-Patent Document 2

Proceedings of Conference on Tribology, Society of Tribology, November 2001, P 291.

However, since in the case of a bearing assembly that is used in a gap condition, that is, in the case of a bearing assembly that is used in a condition in which a loaded region and a non-loaded region exist, tumbling elements (rolling elements and raceway rings) moving past the loaded region excite a stationary ring, vibration is not excited by waviness of any particular order, but is excited by every order of waviness. When the relation between the order of waviness and the amplitude of waviness is plotted on a logarithmic scale, it will exhibit a linear relation in the normal processing (See the Non-patent Document 2 above.).

This is because vibration in the processing machine for the bearing part causes a form error of the bearing, and in general, the higher the degree of vibration is, the smaller the amplitude is. Accordingly, the amplitude or amount of the error of the processed surface in the bearing part decreases in accordance with advance of the order of waviness.

Because of the above, a processing method to reduce the waviness have hitherto been employed in order to reduce the vibration occurring in the bearing assembly.

However, even though the size of the waviness as a whole is small, vibrations (sounds) of the frequency determined by the waviness order and the rotational speed prevails if the waviness of a certain order is considerable, resulting in striking harshly upon the ears. Even though the level of vibrations (acoustics) is low, this characteristic is acoustically undesirable in the bearing assembly.

SUMMARY OF THE INVENTION

In view of the foregoing, the present invention is intended to provide a rolling contact bearing assembly, in which generation of sounds of a prevailing frequency resulting from form errors of a rolling surface of a bearing component part can be suppressed and an increase in acoustic quality can be expected.

The rolling contact bearing assembly of the present invention is of a design having the following relation between the order n and the amplitude r of waviness relative to the circularity of the sectional shape of a rolling surface of at least one of bearing component parts, including raceway rings or rolling elements, in which n represents an arbitrarily chosen natural number:

That is, the order n and the amplitude r of waviness are logarithmically transformed to define $X=Log(n)$ from the order n and $Y=Log(r_n)$ from the amplitude r of n-order, and the ratio $\delta/\sigma$ of the deviation $\delta$ at each X from the regression line of Y to the standard deviation $\sigma$ is made smaller than 4 when the regression line of $Y=aX+b$ is determined.

It is to be noted that the rolling surface of each of the raceway rings referred to above means a raceway surface of such raceway ring.

According to the above described construction, since the order and the magnitude of waviness in the rolling surface of the bearing component part are logarithmically transformed and the ratio $\delta/\sigma$ of the deviation $\delta$ from the determined regression line to the standard deviation $\sigma$ is chosen to be made smaller than 4, all that form an abnormal point can be eliminated from the relation between the order and the amplitude of waviness, which form the linear relationship, and, therefore, vibrations occurring in the bearing assembly can be reduced. In particular, generation of prevailing sounds of particular frequency can be suppressed and, hence, the acoustic quality of the bearing assembly can be increased.

Although the present invention can be applied to any type of rolling contact bearing assembly such as, for example, a ball contact bearing, a cylindrical roller bearing, a tapered roller bearing, a needle roller bearing, a self-aligning ball bearing or any other bearing and also to any type of bearing component parts such as, for example, an inner ring, an outer ring or rolling elements, the present invention is also applicable to, for example, a ball contact bearing, which makes use of a ball retainer, or a bearing assembly utilizing an inner ring, in which the ratio $\delta/\sigma$ is smaller than 4. In a preferred embodiment of the present invention, results of experiments are presented for a ball contact bearing, in which a ball retainer is utilized and the bearing component part is an inner ring.

In the practice of the present invention, the order n and the amplitude r of waviness may be a numerical value that can be obtained by means of a harmonic analysis performed on a measurement signal obtained by measuring the rolling surface of the rolling component part and indicative of the amount of deflection relative to the circularity. The harmonic analysis is a method of determining the order n and the amplitude r of waviness by Fourier transforming the circularity wave form.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF THE PREFERRED EMBODIMENTS

Figure 1:
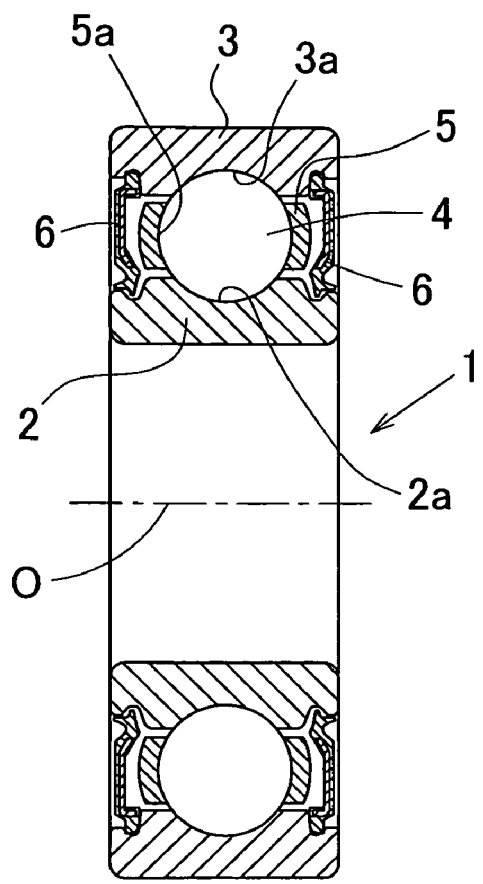
FIG. 1 is a sectional view showing a rolling contact bearing assembly according to a preferred embodiment of the present invention.
Figure 2:
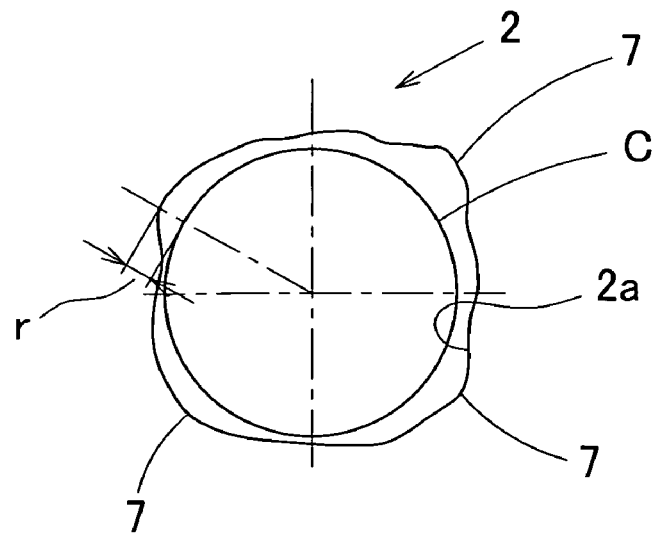
FIG. 2 is an explanatory diagram showing an example of waviness appearing in an inner ring raceway surface thereof.

A preferred embodiment of the present invention will now be described with particular reference to FIGS. 1 to 5. As shown in FIG. 1, a rolling contact bearing assembly 1 is in the form of a ball contact bearing such as, for example, a deep groove ball bearing and includes an inner ring 2 and an outer ring 3, both of which are respective raceway members, and a plurality of rolling elements 4 such as, for example, balls interposed between raceway surfaces 2a and 3a defined respectively in the inner and outer rings 2 and 3, a retainer 5 for retaining the rolling elements 4 in a circular row, and sealing members 6 for sealing opposite ends of a bearing space delimited between the inner and outer rings 2 and 3. The respective raceway surfaces 2a and 3a of the inner and outer rings 2 and 3 are formed to represent an arcuate shape. The retainer 5 has a pocket 5a defined at a plurality of locations in a circumferential direction thereof with the rolling elements 4 retained in those pockets 5a. The raceway surfaces 2a and 3a of the inner and outer rings 2 and 3 and outer spherical surfaces of the rolling elements 4 form respective rolling surfaces of the inner and outer rings 2 and 3 and the rolling elements 4, which are bearing component parts.

The sectional shape of an arbitrarily chosen diametric portion of each of the rolling elements 4, which are in the form of balls, and the sectional shape of the raceway surface 2a of the inner ring 2 and the raceway surface 3a of the outer ring 3 as viewed in a direction perpendicular to a bearing longitudinal axis O should be ideally just round. However, as shown exaggeratedly in FIG. 2 in connection with, for example, the inner ring 2, those sectional shapes have waviness or undulation, including some waves or hills 7, against the complete round C due to a form error in manufacture. It is to be noted that although in FIG. 2, the number of waves is shown as four (4) for the sake of clarity, the number n of those waves 7 or the order n of waviness and the amplitude r of waviness vary depending on the processing method.

In the embodiment now under discussion, the relation between the order n (n being an arbitrarily chosen natural number) and the amplitude r of waviness in any of the raceway surface 2a in the inner ring 2, the raceway surface 3a in the outer ring 3 and the outer spherical surface of each of the rolling elements 4 is so defined as follows:

Specifically, the order n and the amplitude r are logarithmically transformed to define $X=\text{Log}(n)$ from the order n and $Y=\text{Log}(r_n)$ from the amplitude r of n-order, and the ratio $\delta/\sigma$ of the deviation $\delta$ at each X from the regression line of Y to the standard deviation $\sigma$ is chosen to be smaller than 4 when the regression line of $Y=aX+b$ is determined.

It is to be noted that "a" represents a constant indicative of the gradient of the regression line and "b" represents a constant which forms an Y-axis intersection of the regression line.

The order n and the amplitude r of waviness are a numerical value obtained by conducting the harmonic analysis, as will be described later, on the circularity of the bearing component part.

It is to be noted that although in the foregoing embodiment, the relation between the order n and the amplitude r of waviness has been described such that in any of the inner ring 2, the outer ring 3 and each of the rolling elements 4, the ratio $\delta/\sigma$ can be so chosen as to be smaller than 4, the above discussed relation may be establish in at least one or more of the inner ring 2, the outer ring 3 and each rolling element 4.

Figure 3:
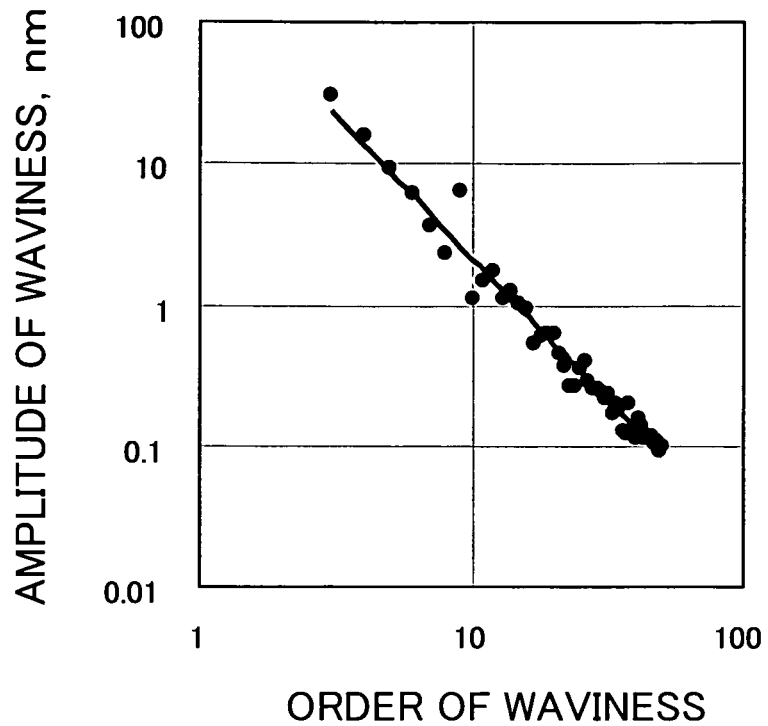
FIG. 3 is a graph showing an example of measurement of the relation between the order and the amplitude appearing in an inner ring.

Hereinafter, results of experiments will be discussed. FIG. 3 illustrates an example of measurement of the relation between the order of waviness and the amplitude of waviness occurring in the inner ring 2. It can be understood that a linear relation is established between them on a logarithmic scale.

A regression line is shown in FIG. 3 and it is clear that the amplitude of order nine is prevailing.

Figure 4:
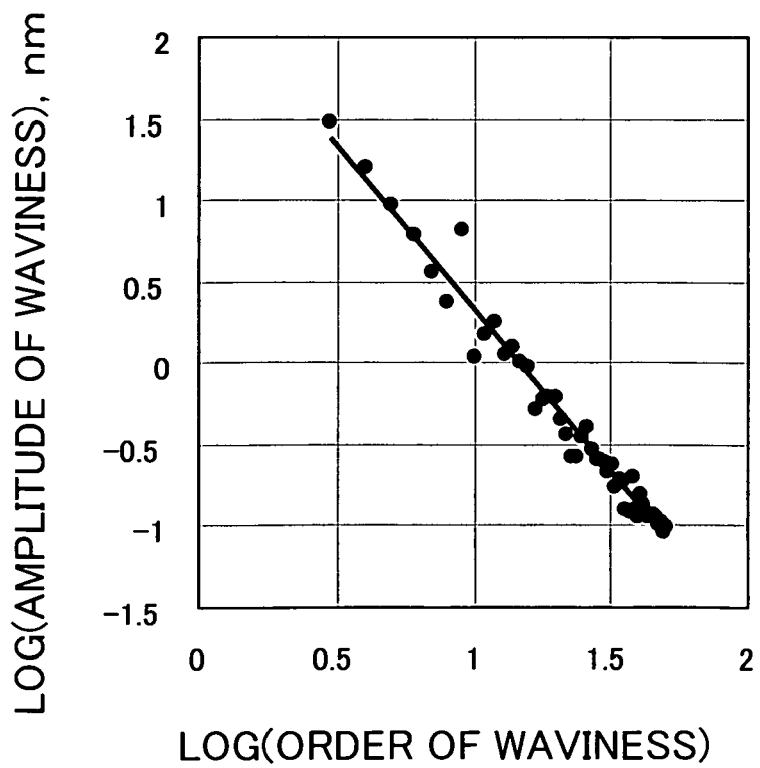
FIG. 4 is a graph showing results of logarithmic transformation of the relation shown in FIG. 3.

Results of logarithmic transform of X-axes and Y-axes into Log X and Log Y, respectively, are shown in FIG. 4.

In this X-Y coordinate system, the standard deviation $\sigma$ and the deviation $\delta$ at each X from the regression line of Y are calculated.

Figure 5:
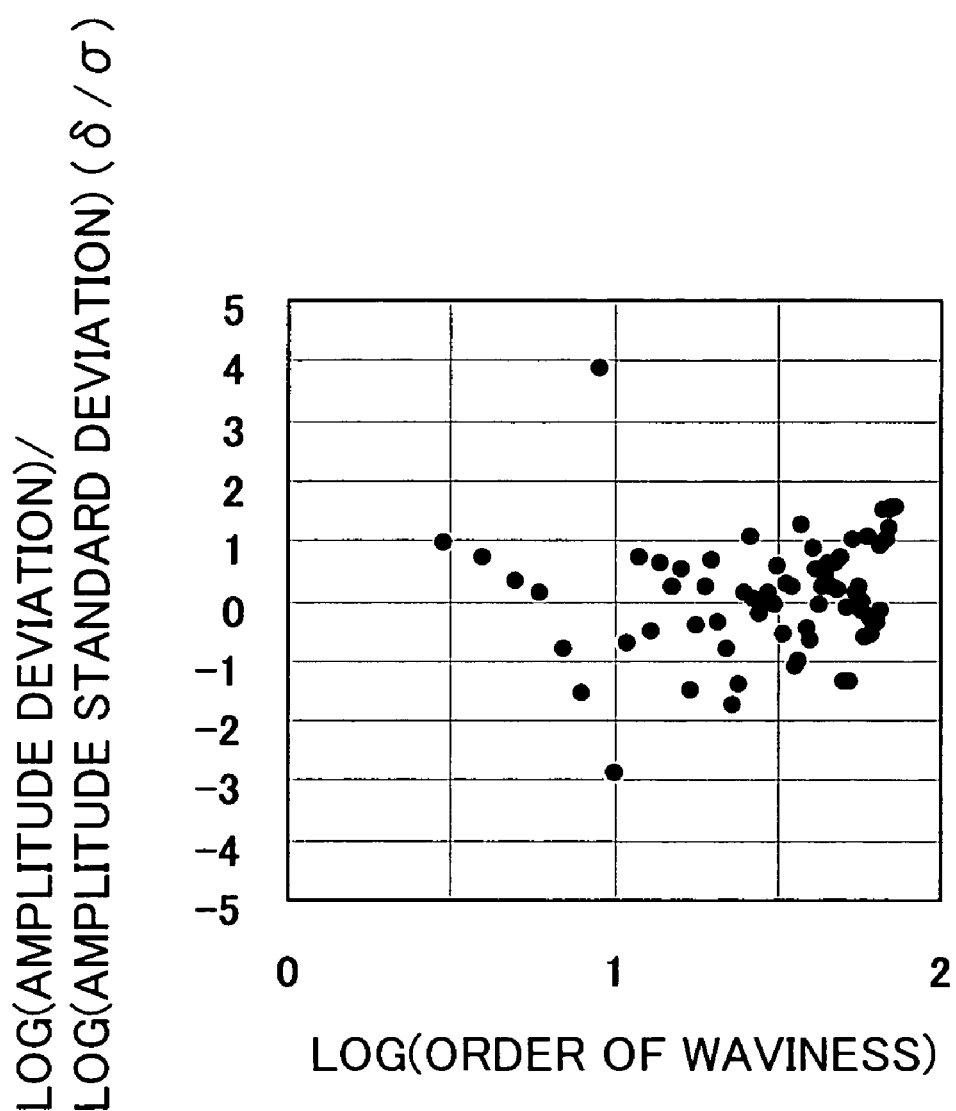
FIG. 5 is a graph showing a deviation from a regression line and a standard deviation.

Such relation is shown in FIG. 5 and it can readily be seen that the ratio of the deviation of waviness of order nine to the standard deviation exceeds 4.

The harmonic analysis was carried out on waviness of the inner ring of the ball contact bearing assembly to determine the ratio $\delta/\sigma$ and, an acoustic test was then carried out after incorporation of the inner ring into the bearing assembly to experimentally examine the acoustic quality. As a result, it has been clarified that if the ratio $\delta/\sigma$ is equal to or more than 4, a problem would arise. The condition, under which the acoustic test was conducted, included the use of a deep groove ball bearing identified by the bearing number 6203 according to the JIS (Japanese Industrial Standards) for a bearing assembly to be tested, the rotational speed of 1,800 rpm, the radial load of 2 kgf, and an oil lubrication. Bearing acoustics were measured with a microphone and the acoustic quality was determined aurally. Results are tabulated in Table 1 below:

TABLE 1

Results of Acoustic Test

| Ratio $\delta/\sigma$ | Acoustic Quality |
|---|---|
| 2.0 | O.K. |
| 2.7 | O.K. |
| 3.2 | O.K. |
| 3.6 | O.K. |
| 3.8 | O.K. |
| 4.0 | NO |
| 4.3 | NO |

For the harmonic analysis of the waviness, a circularity measuring instrument, such as one tradenamed "TALYROND" was used. An waviness measuring instrument, which is tradenamed "WEVIMETER" or the like may be used. The circularity measuring instrument with TALYROND is carried out by setting a bearing component part, which forms an object to be measured, on a table in alignment with the center of rotation of a detector, tracing a rolling surface (or a raceway surface in the case of the raceway ring) with a measuring probe fitted to the detector of a differential transformer type and converting the amount of swing thereof into an electric signal. The circularity waveform represented by this electric signal is processed with a computer to perform the harmonic analysis. Data on the order of waviness which are used in a regression analysis were limited to 3 to 50. The waviness containing two orders has a generally large amplitude, but is unnecessary in discussing over the problem associated with vibrations since the frequency thereof is low. On the other hand, the waviness of order 50 or higher was exempted from the object of measurement partly because the measurement of such waviness requires a substantial number of measurement steps and partly because the number of occurrence of an abnormal waviness in lineup is small.

The use of the same measurement conditions and the same analysis conditions on this occasion regardless of the type of bearing assembly and, also, the type of the bearing component results in no problem.

As hereinabove discussed, the vibration in the bearing assembly can be reduced since at least one or more of the inner ring 2, the outer ring 3 and each of the rolling elements 4, all employed in the rolling contact bearing assembly 1 has no abnormal point as the ratio $\delta/\sigma$ is so chosen as to be smaller than 4 in connection with the relation between the order and the amplitude of waviness, which are in a linear relationship with each other.

In other words, in the present invention, the harmonic analysis is carried out on the waviness occurring in the rolling surface of each of the rolling elements 4, the inner ring 2 and the outer ring 3 and, for the equation related with the order n and the amplitude r of waviness, the logarithmic transform is carried out to define $X=\text{Log}(n)$ from the order n and $Y=\text{Log}(r_n)$ from the amplitude r of waviness containing the n-order so that the regression line $Y=aX+b$ can be determined, and the deviation $\delta$ at each X from the regression line of Y is normalized by the standard deviation $\sigma$ and the ratio $\delta/\sigma$, which is the dimensionless number, is so chosen to be smaller than 4. Accordingly, generation of prevailing sounds of the particular frequency can be suppressed and the acoustic quality of the bearing assembly can be increased.

What is claimed is:

1. A rolling contact bearing assembly comprising bearing component parts including a raceway ring and a rolling element, a diametric portion of each of the rolling element and the raceway ring viewed in a direction perpendicular to a bearing longitudinal axis being a rolling surface having less than perfect circularity, the rolling surface of at least one of the bearing component parts satisfying the following relation between the number n, n being an arbitrarily chosen natural number, and the amplitude r of waviness of the rolling surface relative to perfect circularity:

logarithmically transforming the order n and the amplitude of waviness to define $X=\text{Log}(n)$ from the order n and $Y=\text{Log}(r_n)$ from the amplitude r of n-order; and when a regression line of $Y=aX+b$ is determined, the ratio $\delta/\sigma$ of the deviation $\delta$ at each X from the regression line of Y to the standard deviation $\sigma$ is made smaller than 4.

2. The rolling contact bearing assembly as claimed in claim 1, wherein the bearing assembly is a ball contact bearing having a retainer and wherein an inner ring has the ratio $\delta/\sigma$ smaller than 4.

3. The rolling contact bearing assembly as claimed in claim 1, wherein the order n and the amplitude r of waviness represent a numerical value obtained by harmonic analysis of a measurement signal measured on the rolling surface of the bearing component part and indicative of an amount of swings relative to the perfect circularity.

4. A method of making a rolling contact bearing assembly comprising:

providing bearing component parts including a raceway ring and a rolling element, a diametric portion of each of the rolling element and the raceway ring viewed in a direction perpendicular to a bearing longitudinal axis being a rolling surface having less than perfect circularity, wherein the rolling surface of at least one of the bearing component parts satisfies the following relation between the number n, n being an arbitrarily chosen natural number, and the amplitude r of waviness of the rolling surface relative to perfect circularity:

logarithmically transforming the order n and the amplitude of waviness to define $X=\text{Log}(n)$ from the order n and $Y=\text{Log}(r_n)$ from the amplitude r of n-order; and when a regression line of $Y=aX+b$ is determined, the ratio $\delta/\sigma$ of the deviation $\delta$ at each X from the regression line of Y to the standard deviation $\sigma$ is made smaller than 4.

5. The method of making a rolling contact bearing assembly as claimed in claim 4, wherein the bearing assembly is a ball contact bearing having a retainer and wherein an inner ring has the ratio $\delta/\sigma$ smaller than 4.

6. The method of making a rolling contact bearing assembly as claimed in claim 4, wherein the order n and the amplitude r of waviness represent a numerical value obtained by harmonic analysis of a measurement signal measured on the rolling surface of the bearing component part and indicative of an amount of swings relative to the perfect circularity.

* * * * *